J. H. LYNCH.
Refrigerator.
No. 105,101.
Patented July 5, 1870.
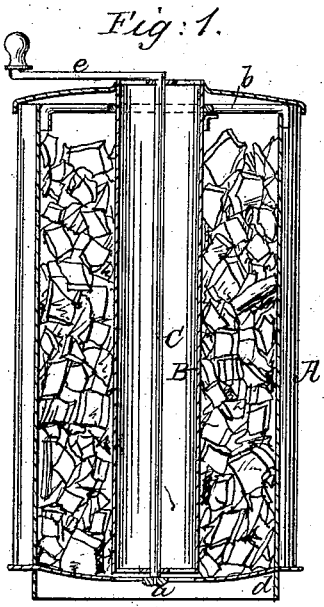
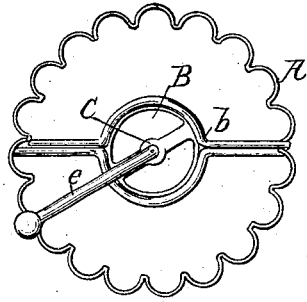
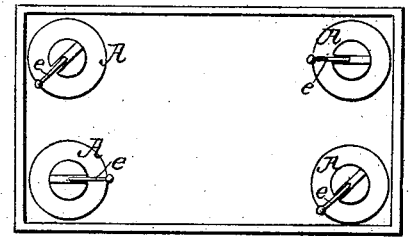
Witnesses
E. Wahlers
E. F. Kastenhuber
Inventor
John H. Lynch
per
Van Santvoord & Hauff
Attys

UNITED STATES PATENT OFFICE.

JOHN H. LYNCH, OF NEW YORK, N. Y.

IMPROVED ICE-CHAMBER FOR REFRIGERATORS.

Specification forming part of Letters Patent No. 105,101, dated July 5, 1870.

*To all whom it may concern:*

Be it known that I, JOHN H. LYNCH, of the city, county, and State of New York, have invented a new and useful Improvement in Ice-Chambers for Refrigerators; and I hereby declare the following to be a full, clear, and exact description thereof, which will enable those skilled in the art to make and use the same, reference being had to the accompanying drawing, forming part of this specification, in which drawing—

Figure 1 represents a vertical central section of this invention. Fig. 2 is a plan or top view of the same. Fig. 3 is a diagram, showing its arrangement in a refrigerator-box.

Similar letters indicate corresponding parts.

This invention consists in the arrangement of a revolving agitator, with devices for steadying the same, in the interior of the ice-chamber of a refrigerator, said ice-chamber being made of a corrugated cylindrical drum, in such a manner that by working the agitator from time to time the cooling effect of the ice in the ice-chamber is materially increased, and a refrigerator is obtained in which meat, fish, fruit, or other animal or vegetable materials can be readily cooled down to the freezing-point.

In the drawing, A designates the ice-chamber of a refrigerator, which is made of sheet metal by preference, in the form of a cylindrical drum, and corrugated, (see Fig. 2,) the corrugations being intended to increase the cooling-surface of said drum. In the interior of this ice-chamber is placed an agitator, B, which is mounted on a shaft, C, that has its bearing in a socket, $a$, in the bottom of the drum, while the top part of the agitator is steadied by a guide-ring, $b$, formed of two halves, one of which is firmly attached to the top of the drum A, while the other is provided with hooks at its ends to catch in suitable sockets attached to the drum, as shown in Fig. 1, so that it can be easily removed whenever it is desirable to take out the agitator.

The bottom of the drum A is concave and perforated, so as to allow the ice-water to escape, and from the under surface of said bottom projects a rim, $d$, which forms the foot of the drum.

The agitator may be operated by a hand-crank, $e$, and in practice I propose to place two or more of my ice-chambers in the corners of a refrigerator-box, as shown in Fig. 3, and in this case several agitators will be connected by gear-wheels or otherwise, so that they can be revolved simultaneously.

By the action of the agitator the cooling effect of the pounded ice and salt, or other freezing-mixture placed in the drum A, is materially increased, and a refrigerator is obtained in which animal and vegetable materials of any desired description can be easily cooled down to the freezing-point, and thus preserved for a long time even in the hottest season.

What I claim as new, and desire to secure by Letters Patent, is—

An ice-chamber for refrigerator, consisting of the corrugated drum A, agitator B, and ring $b$, constructed and operating substantially as and for the purpose described.

JOHN H. LYNCH.

Witnesses:
W. HAUFF,
C. WAHLERS.